(12) United States Patent
Huang et al.

(10) Patent No.: US 8,377,587 B2
(45) Date of Patent: *Feb. 19, 2013

(54) ELECTROLYTE FOR ELECTROCHEMICAL DEVICE AND THE ELECTROCHEMICAL DEVICE THEREOF

(75) Inventors: Chih-Wei Huang, Chiayi County (TW); Li-Jane Her, Kaohsiung County (TW); Jou-Yeh Su, Kaohsiung County (TW)

(73) Assignee: Taiwan Hopax Chems, Mfg. Co., Ltd. (TW)

( * ) Notice: Subject to any disclaimer, the term of this patent is extended or adjusted under 35 U.S.C. 154(b) by 440 days.

This patent is subject to a terminal disclaimer.

(21) Appl. No.: 12/659,749

(22) Filed: Mar. 19, 2010

(65) Prior Publication Data

US 2010/0316915 A1    Dec. 16, 2010

(30) Foreign Application Priority Data

Jun. 15, 2009   (TW) ................................ 98119944 A

(51) Int. Cl.
*H01M 6/04* (2006.01)

(52) U.S. Cl. ......... 429/188; 429/324; 429/336; 429/338

(58) Field of Classification Search .................. 429/188, 429/324–341
See application file for complete search history.

(56) References Cited

U.S. PATENT DOCUMENTS

| 5,731,104 A * | 3/1998 | Ventura et al. ................ 429/188 |
| 6,015,638 A * | 1/2000 | Ventura et al. ................ 429/307 |
| 2010/0183927 A1* | 7/2010 | Her et al. ....................... 429/338 |

FOREIGN PATENT DOCUMENTS

JP        07165751 A   *  6/1995

OTHER PUBLICATIONS

Webster, "Cyclic carbonate functional polymers and their applications", Progress in Organic Coatings, 2003, vol. 1, pp. 77-86.

* cited by examiner

*Primary Examiner* — Basia Ridley
*Assistant Examiner* — Heng Chan
(74) *Attorney, Agent, or Firm* — Bacon & Thomas, PLLC

(57) ABSTRACT

The present invention provides an electrolyte containing novel additive for electrochemical device and the electrochemical device thereof. The additive is a compound represented by below formula (I):

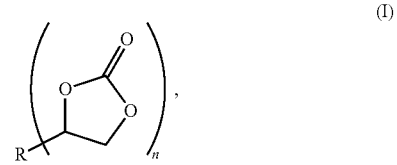

wherein R is defined as herein; n is 2, 3, or 4. The additive of the present invention can protect the surface of the carbonaceous material on the anode, suppresses the occurrence of exfoliation, and therefore increases the lifetime of the electrochemical device. Furthermore, the additive of the present invention also slows down the decay of capacity on the cathode during charging-discharging cycles, and hence maintains a better performance.

10 Claims, 9 Drawing Sheets

ELECTROLYTE FOR ELECTROCHEMICAL DEVICE AND THE ELECTROCHEMICAL DEVICE THEREOF

BACKGROUND OF THE INVENTION

1. Field of the Invention

The present invention relates to an electrochemical device, and more particularly to an electrolyte additive which is useful to suppress the occurrence of degradation, and an electrochemical device having the same.

2. Description of the Related Art

In recent years, there is an increase tendency to research the energy saving technology. Rechargeable Batteries have been popularly applied in several aspects, such as mobile phones, camcorders, and notebooks. The related field has been extensively researched, wherein secondary batteries are more interested. For secondary batteries, the major research is in enhancing the energy density and their cycle life.

In current secondary batteries, lithium ion secondary batteries are developed in 1990. In comparison with traditional batteries using aqueous electrolytes (such as nickel-Hydride batteries, nickel-Cadmium batteries, and lead acid batteries), lithium ion secondary batteries have high working voltage and energy density. Therefore, people invest a lot of time in researches of lithium ion batteries. However, one of the drawbacks of lithium ion batteries is the capacity fading during repeated charging-discharging cycles. The more the capacity of a lithium ion secondary battery has, the more serious this problem is. Hence, lifetimes of lithium ion secondary batteries need to be further enhanced. One of approaches to enhance the lifetimes of lithium batteries is to modify electrolyte composition by suitable additives.

In the electrolytes of lithium ion batteries, carbonate-based organic compounds are commonly used as solvents. According to their structure and characteristic, they are briefly classified into two groups. One is cyclic carbonates with high dielectric constant and viscosity, such as ethylene carbonate (EC) and propylene carbonate (PC); the other group is linear carbonates with low dielectric constant and viscosity, such as dimethyl carbonate (DMC), diethyl carbonate (DEC), and ethyl methyl carbonate (EMC). An ideal electrolyte must have high dielectric constant and low viscosity at the same time. Thus, general electrolytes contain a mixture of cyclic carbonates and linear carbonates to obtain the required properties of both dielectric constant and viscosity.

However, EC and PC have the following characteristics, respectively. During the first charging step, EC can form a stable passivation layer, such as a solid electrolyte interface (SEI), on the surface of anode to protect the anode material from exfoliation, while PC can not do the same. However, EC will loss its fluidity under 37° C. (melting point of EC), it will result in poor charging-discharging performances of battery under low temperature. Conversely, PC still has a good fluidity under low temperature, arising from its low melting point (−49° C.), but it is prone to produce co-intercalation with lithium ions into graphite layers during a charge process, resulting in detrimental graphite exfoliation. Thus, if the content of PC is too high, it usually results in decreasing the lifetime of a battery.

In order to solve the above problems, a mixture of EC and PC is usually used in commercially available electrolytes to avoid the above drawbacks and enhance the performance of a battery. Except for adjusting the ratio of solvents, using additives is the most effective way to improve lifetime, capacity, low temperature performance and of a battery. Nevertheless, common additives such as vinylene carbonates, sulfites, sulfates, phosphates or derivatives thereof have not only expensive prices, but also barely satisfactory effects.

In this regard, Japanese publication patent 2002-158034 disclosed an acrylic acid compound used as an additive of electrolyte in a lithium ion secondary battery. The additive (acrylic acid) can suppress gas reduction and the decay of anode in the lithium ion secondary battery. Besides, Japanese publication patent 2003-168479 disclosed an acrylic acid compound with at least three acrylic aldehyde groups used as an additive of electrolyte in a lithium ion secondary battery. The compound can form a solid electrolyte interface (SEI) layer by the reduction reaction on the anode. The SEI layer can suppress the degradation of an electrolyte and to improve cycle life of the battery. In addition, WO 2008/050971 disclosed an acrylic acid compound with a polymerizable double bond used as an additive of electrolyte in a lithium ion secondary battery. The acrylic acid compound also had the effect of forming a SEI layer.

Based on the existing techniques, we desire to develop a novel additive of lithium ion secondary battery which is useful for forming a steady SEI layer on the surface of the carbonaceous material to suppress its exfoliation, thereby further enhancing the lifetime of a lithium ion secondary battery.

SUMMARY OF THE INVENTION

In view of the disadvantages of conventional technology, one object of the present invention is to provide an electrolyte for an electrochemical device such as a lithium ion secondary battery. A steady SEI layer can be formed on the surface of the carbonaceous material of the anode by using the new additive to suppress the occurrence of exfoliation, thereby enhancing the lifetime of a battery. Moreover, the electrolyte is beneficial to slow down the decay of capacity on the cathode during charging-discharging cycles. Hence, it can maintain a better performance for long.

Another object of the present invention is to provide an electrochemical device using said electrolyte. Because the electrolyte has the novel additive, it can form a steady SEI layer on the surface of the carbonaceous material of the anode to suppress the occurrence of exfoliation, thereby enhancing the lifetime of a battery. Moreover, the electrolyte is beneficial to slow down the decay of capacity on the cathode during charging-discharging cycles. Therefore, it can maintain a better performance for long.

To achieve the above objects, the present invention provides an electrolyte, for an electrochemical device, comprising 1.18-35.4 wt % of a salt, 0.1-9 wt % of a compound represented by below formula (I), and an organic solvent as a complement to 100 wt %,

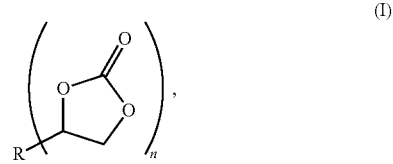

(I)

wherein R is an aliphatic or aromatic residue unsubstituted or substituted with one or more substituents, and said substituents are selected from the group consisting of one or more halogen, $C_1$-$C_8$ alkyl, $C_1$-$C_8$ alkoxy, $C_6$-$C_{10}$ aryl, $C_6$-$C_{10}$ aryloxy, $C_3$-$C_6$ cycloalkyl, $C_3$-$C_6$ cycloalkoxy, $C_1$-$C_3$ carboxy, and sulfur; n is 2, 3, or 4, in which one or more methylene groups (—$CH_2$—) in the aliphatic or aromatic residue can be independently replaced by oxygen (—O—), $C_6$-$C_{10}$ arylene, $C_6$-$C_{10}$ cycloalkylene,

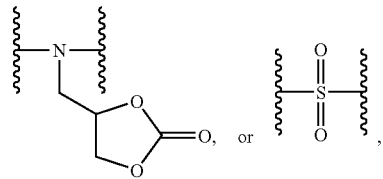

When said compound represented by the formula (I) is used as an additive of electrolyte, it can form a special SEI layer on the surface of the carbonaceous material of the anode in the electrochemical device. Said special SEI layer not only can protect the structure of the carbonaceous material, but also can suppress the occurrence of exfoliation during charging-discharging cycles. Hence, it is able to enhance the lifetime of battery. Moreover, compared to the conventional additives, propane sultone (PS) and vinylene carbonate (VC), the additive of the present invention can increase the tolerance of the carbonaceous material in PC electrolyte and can fulfill the effect of protecting the carbonaceous material by less amount of additive. Besides, the additive is useful to slow down the decay of capacity on the cathode during charging-discharging cycles, and hence maintains a better performance for long.

Preferably, the additive of the present invention comprises the below formulas:

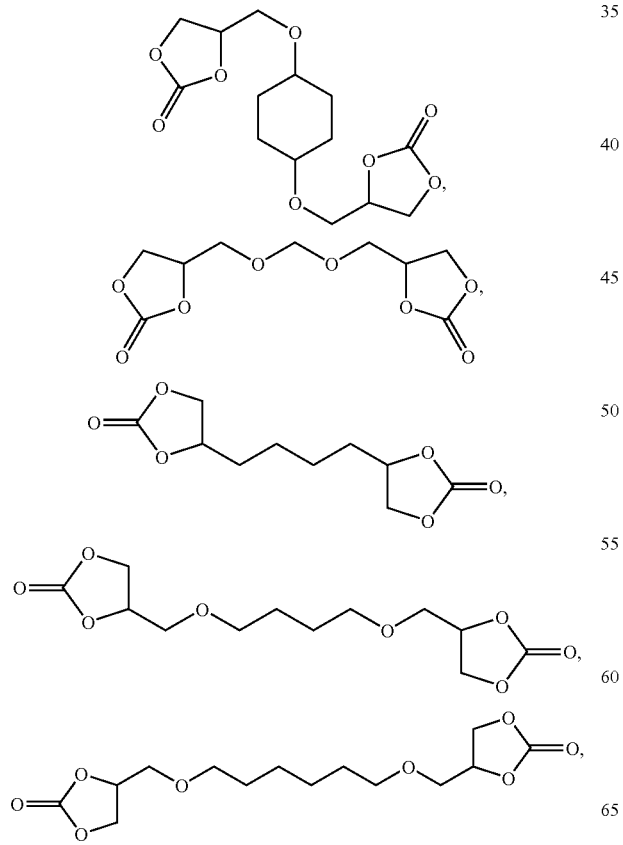

-continued

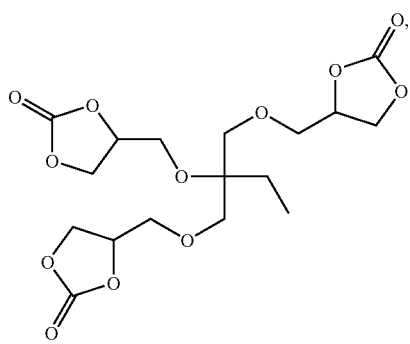

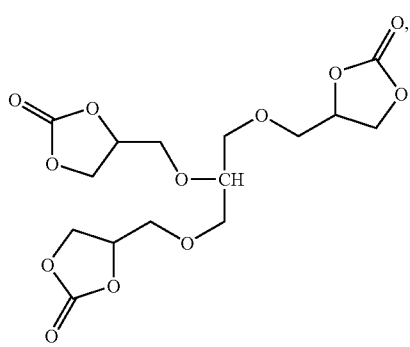

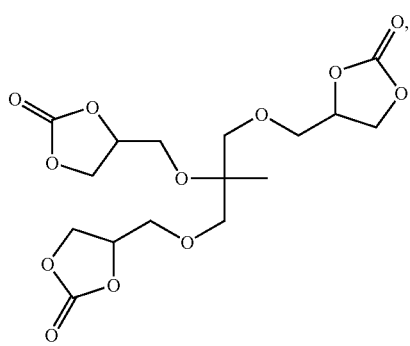

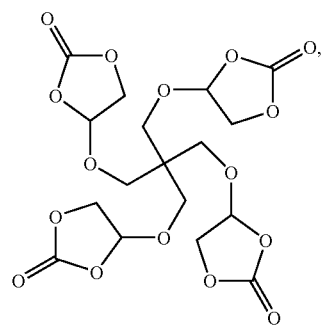

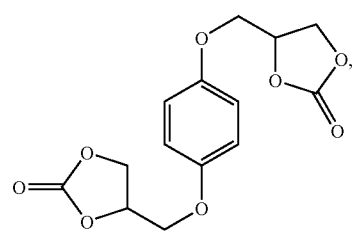

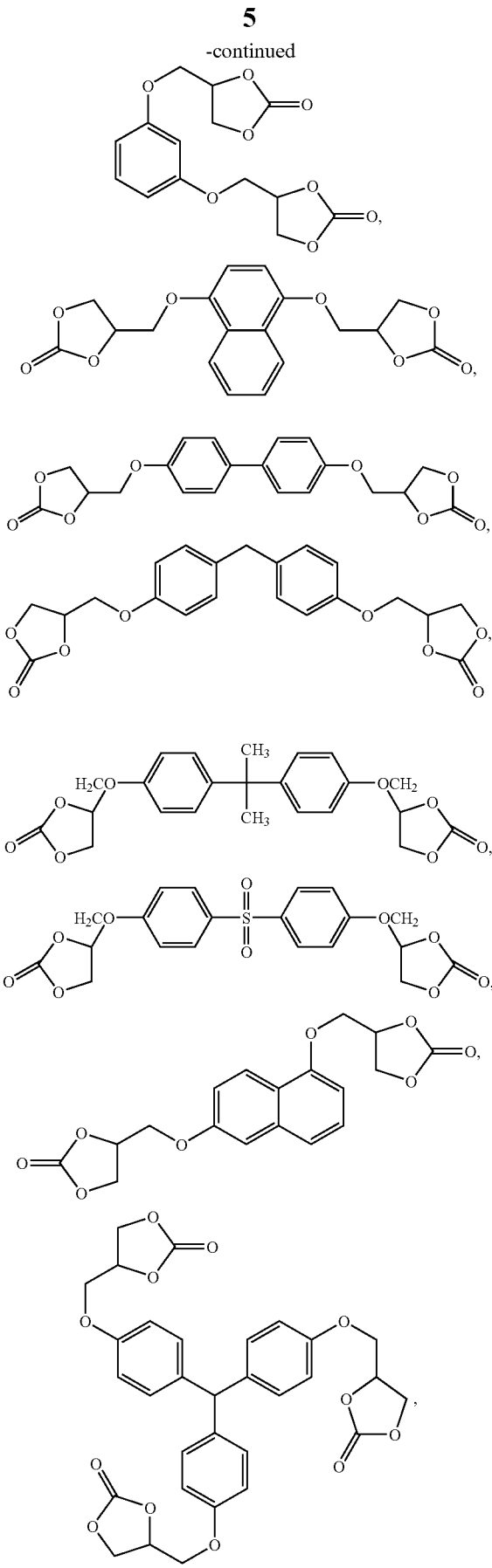

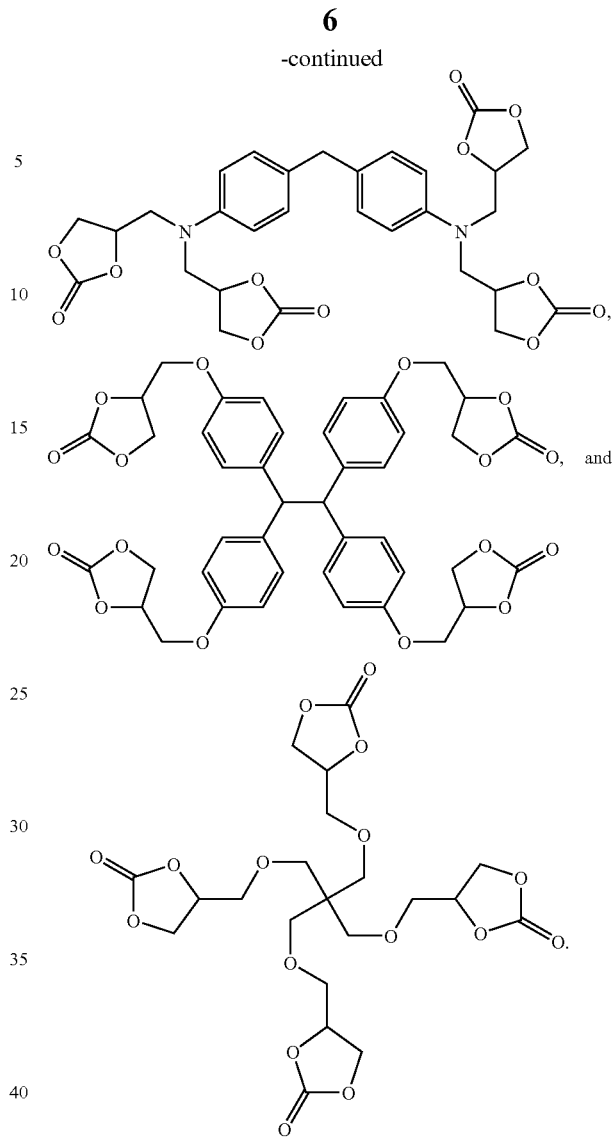

Preferably, the amount of the compound represented by formula (I) is 0.1-9.0 wt %. More preferably, the amount of the compound represented by formula (I) is 0.5-5 wt %.

Preferably, the amount of the salt is 5.9-23.6 wt %. Preferably, said organic solvent is selected from the group consisting of cyclic carbonates, linear carbonates, lactones, ethers, esters, acetonitriles, lactams, ketones, and halogen derivatives thereof. More preferably, the organic solvent is a mixture of the cyclic carbonates and the linear carbonates.

Preferably, a cation of said salt is selected from the group consisting of $Li^+$, $Na^+$, and $K^+$, and an anion of said salt is selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, and $C(CF_2SO_2)_3^-$.

The present invention also provides an electrochemical device, comprising an anode, a cathode, and the electrolyte of the present invention.

Preferably, said electrochemical device is a lithium ion secondary battery.

Yet the present invention provides a use of a compound represented by formula (I) for using as an additive of electrolyte.

From above, a new additive is used in the electrolyte of present invention for an electrochemical. The new additive can form a special SEI layer on the surface of the carbonaceous material of the anode to suppress the occurrence of exfoliation, thereby enhancing the lifetime of battery. Besides, the new additive can slow down the decay of capacity on the cathode. Compared to the conventional additives of electrolyte (such as propane sultone (PS) and vinylene carbonate (VC)), the new additive has the more excellent effect on suppressing the occurrence of exfoliation.

DETAILED DESCRIPTION OF THE PREFERRED EMBODIMENTS

Figure 1A:
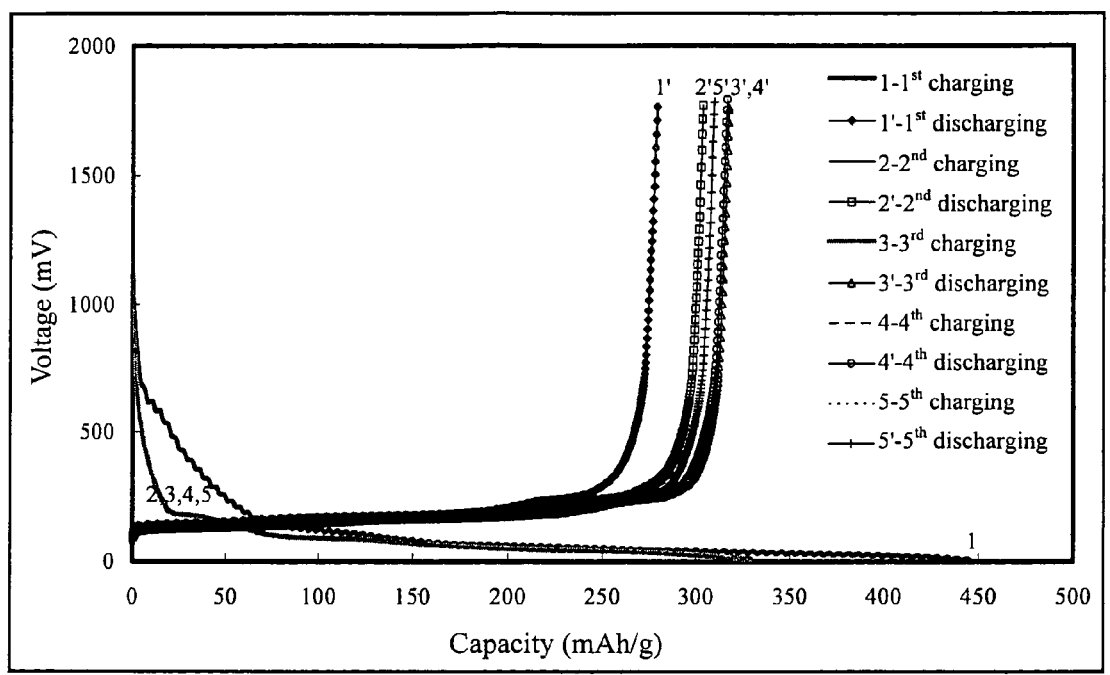
FIG. 1A shows the result of charging-discharging test according to the battery of example 1 of the present invention.

As above-mentioned, a new additive is used in the electrolyte of present invention for an electrochemical device. The new additive can form a special SEI layer on the surface of the carbonaceous material of the anode. This special SEI layer not only can protect the structure of the carbonaceous material, but also can suppress the occurrence of exfoliation during charging-discharging cycles, resulting in increase of the battery lifetime. Moreover, the new additive not only can enhance the tolerance of the carbonaceous material in PC electrolyte, but also can fulfill the effect of protecting the carbonaceous material by less amount of additive when compare with the traditional additive (PS and VC). Besides, the additive is also useful to slow down the decay of capacity on the cathode during charging-discharging cycles, and hence maintains a better performance for long.

The organic solvent used in the present invention is mainly used as a complement of the electrolyte to 100 wt %. In a preferred embodiment, the amount of the solvent is preferably 64.5~98.81 wt %, and more preferably 76.4~94.1 wt %. However, it should be known that the amount of solvent can be adjusted as requested. The organic solvent used in the present invention can be conventional organic solvents, for example, but not limited to, cyclic carbonates, linear carbonates, lactones, ethers, esters, acetonitriles, lactams, ketones, or halogen derivatives thereof. Preferably, the organic solvent is a mixture of at least one of the cyclic carbonates and at least one of the linear carbonates. Only if the objects of the present invention can be achieved, the ratio of each of organic solvents in a mixture is not specifically limited, for example, the ratio used in the traditional nonaqueous electrolytes of lithium batteries can be used.

The salts used in the present invention are also conventional salts, wherein a cation of the salts comprises, but not limited to, $Li^+$, $Na^+$, or $L^+$, and a anion of the salts comprises, but not limited to, $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, or $C(CF_2SO_2)_3^-$.

The electrolyte of the present invention is suitable for general electrochemical devices, especially lithium ion secondary batteries.

The examples of this invention are provided hereinafter; however, these examples are not used for limit the present invention. Any amendments and modifications can be made by those skilled in the art without departing the spirit and scope of the present invention. The scope of the present invention is defined by the appended claims.

EXAMPLE

Table 1 listed the additives used in the examples of the present invention. These additives are provided for illustrating, and they are not intended to limit the claims of present invention.

TABLE 1 additives used in the examples of the present invention

| Compound No. | Structure | Example/Comparative example |
|---|---|---|
| Compound 1 | 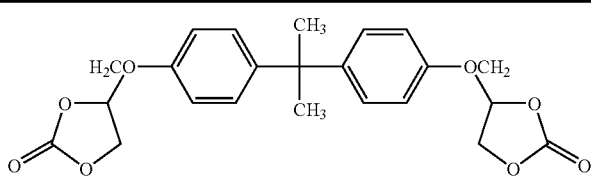 | Examples 1, 3, 4-3, 5-3, and 6 |

TABLE 1-continued
additives used in the examples of the present invention
| Compound No. | Structure | Example/Comparative example |
|---|---|---|
| Compound 2 | 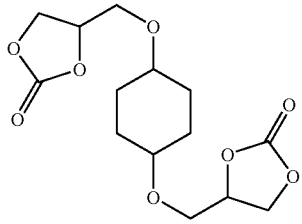 [SMILES: O=C1OCC(COC2CCC(OCC3COC(=O)O3)CC2)O1] | Example 2-1 |
| Compound 3 | 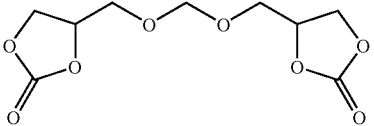 | Examples 2-2, 4-1, and 5-1 |
| Compound 4 | 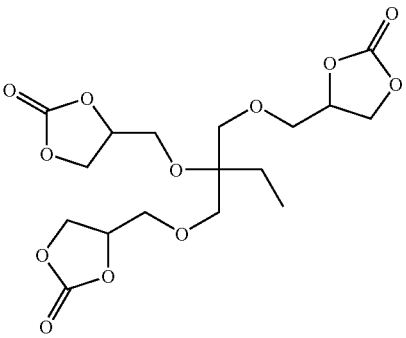 [SMILES: CCC(COCC1COC(=O)O1)(COCC1COC(=O)O1)OCC1COC(=O)O1] | Example 2-3 |
| Compound 5 | 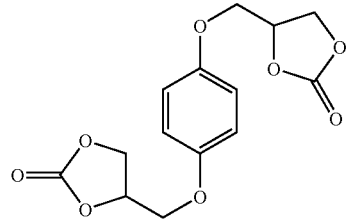 [SMILES: O=C1OCC(COc2ccc(OCC3COC(=O)O3)cc2)O1] | Examples 2-4, 4-2, and 5-2 |
| Compound 6 | 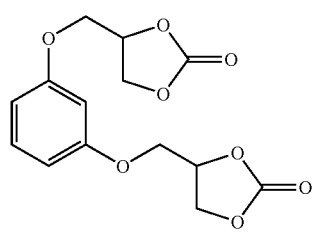 [SMILES: O=C1OCC(COc2cccc(OCC3COC(=O)O3)c2)O1] | Example 2-5 |

TABLE 1-continued additives used in the examples of the present invention

| Compound No. | Structure | Example/Comparative example |
|---|---|---|
| Compound 7 | [structure: tris(carbonate-methyleneoxy-phenyl)methane derivative] | Example 2-6 |
| Compound 8 | H₂CO—C₆H₄—C(CH₃)₂—C₆H₄—OCH₂ diglycidyl ether of bisphenol A | Comparative example 5 |

Example 1

Charging-discharging Test of the Lithium Ion Secondary Battery with the Additive of the Present Invention The test according to the example 1 of the present invention was conducted in the lithium ion secondary battery. Table 2 listed the materials and components used in the lithium ion secondary batteries of the example 1 and comparative examples 2~5. The comparative example 2 used the same materials as the example 1 except no additive; the comparative example 3 used the same materials as the example 1 except use of 1.0 wt % PS as an additive; and the comparative example 4 used the same materials as the example 1 except use of 1.0 wt % VC as an additive. The electrode materials used in the present invention and the methods for producing the same were known in the art and the technical features of the present invention can be easily understood and performed by one skilled in the art according to the disclosure herein, so the processes were not mentioned in detail here.

TABLE 2 the materials and components used in the lithium ion secondary batteries of the example 1 and comparative examples 2~5

| | Anode sheet | NG/conductive carbon black/ PVdF = 90/3/7 (wt %) |
|---|---|---|
| Electrolyte | Organic solvent | PC:DEC = 1:2 (by weight) |
| | Salt | LiPF$_6$ at a concentration of 11.8 wt % |
| Additive | Example 1 | Compound 1 in the amount of 1.0 wt % |
| | Comparative example 2 | None |
| | Comparative example 3 | PS in the amount of 1.0 wt % |

TABLE 2-continued the materials and components used in the lithium ion secondary batteries of the example 1 and comparative examples 2~5

| Comparative example 4 | VC in the amount of 1.0 wt % |
|---|---|
| Comparative example 5 | Compound 8 in the amount of 1.0 wt % |

*NG: natural crystalline flake graphite
PVdF: polyvinylidene difluoride
DEC: diethyl carbonate
EC: ethylene carbonate
PS: 1,3-propane sultone
VC: vinylene carbonate Charging-discharging Test In order to test charging-discharging performance of batteries, the batteries of the example 1 and the comparative examples 2, 3, 4, and 5 were fabricated into coin half-cell, and then connected with a charging-discharging tester (8 channels). During the charging-discharging test, the batteries were charged at 0.1 C to a cut-off voltage of 3 mV, and then discharged at 0.1 C to a cut-off voltage of 1800 mV, which was defined as a charging-discharging cycle. In this test, there was totally five charging-discharging cycles. Besides, changes of voltage were recorded by a computer during the test and the resulting data were calculated to obtain the values of capacity.

Figure 1B:
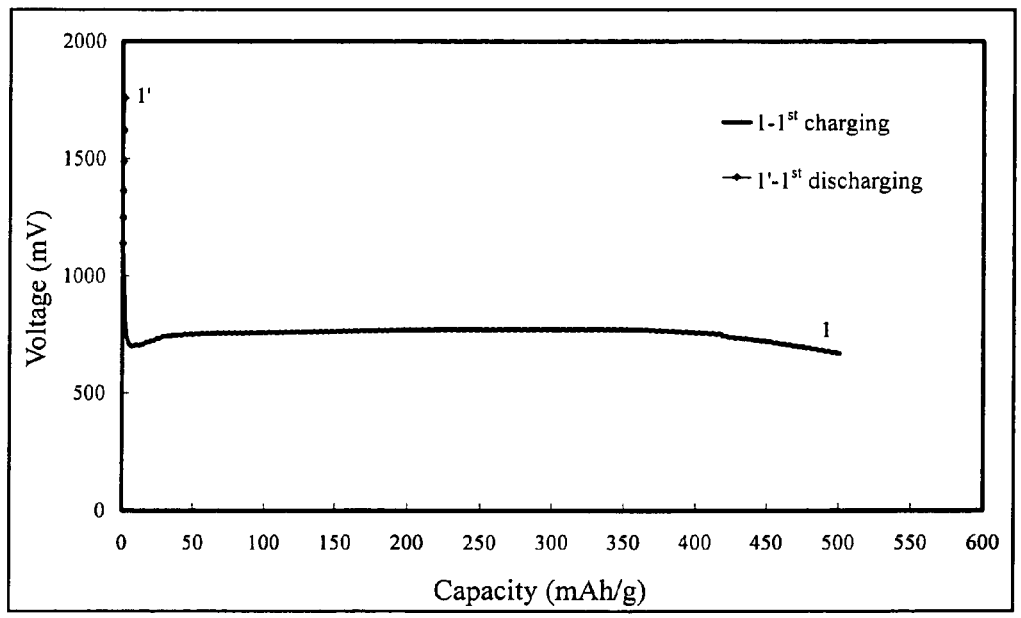
FIG. 1B shows the result of charging-discharging test according to the battery of comparative example 2 of the present invention.
Figure 1C:
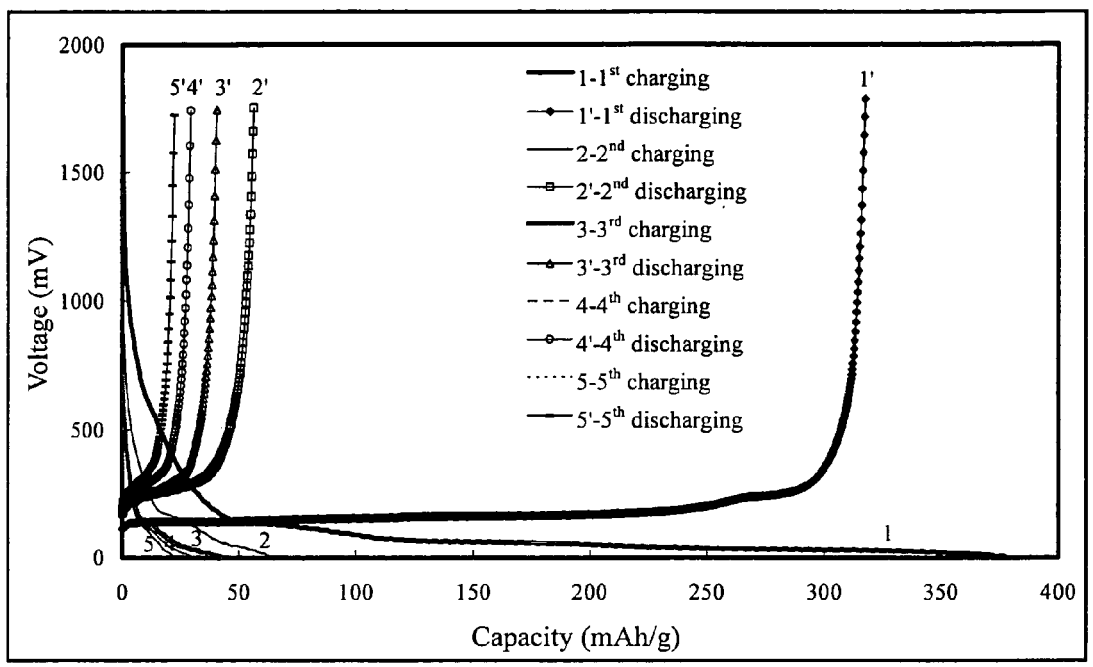
FIG. 1C shows the result of charging-discharging test according to the battery of comparative example 3 of the present invention.
Figure 1D:
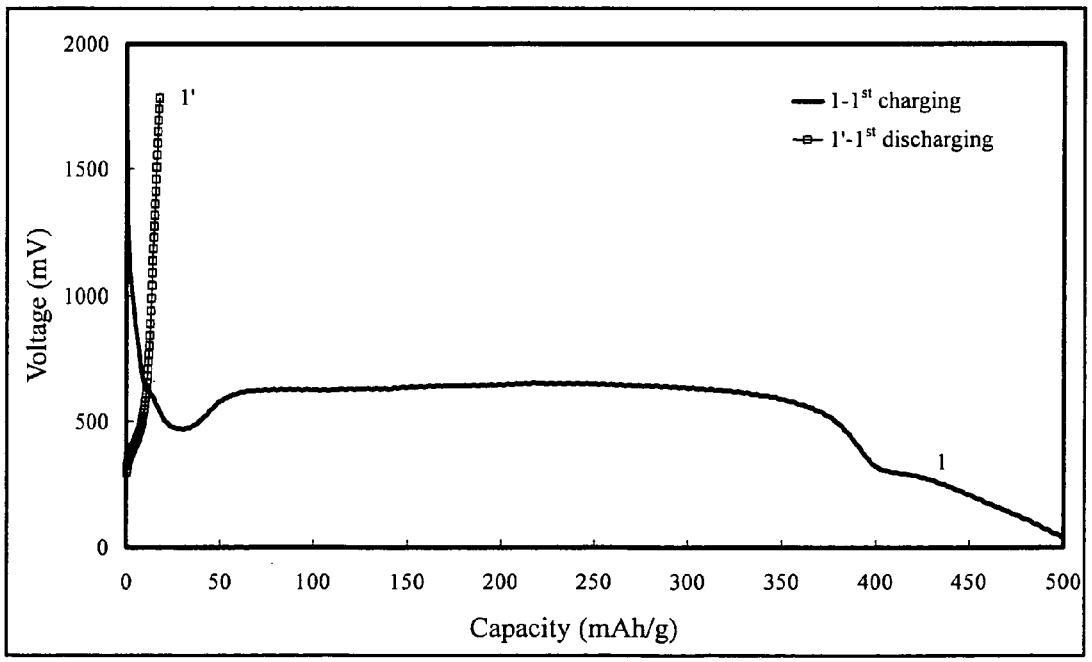
FIG. 1D shows the result of charging-discharging test according to the battery of comparative example 4 of the present invention.
Figure 1E:
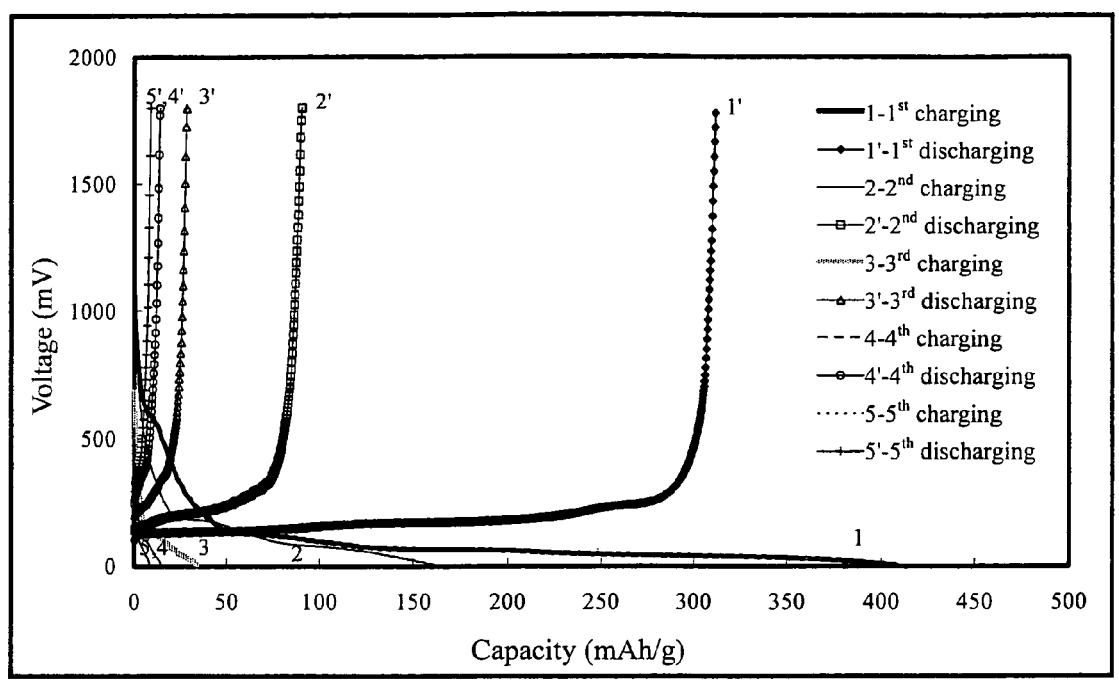
FIG. 1E shows the result of charging-discharging test according to the battery of comparative example 5 of the present invention.

FIG. 1A to FIG. 1E showed the result of charging-discharging test according to the batteries of the example 1, the comparative examples 2, 3, 4, and 5, respectively. In these figures, FIG. 1A showed that the battery of the example 1 with the compound 1 in the amount of 1 wt % had a discharging capacity of more than 300 mAh/g, indicating that the battery still maintained an excellent reversible charging-discharging property after continuous five charging-discharging tests. FIG. 1B showed that the battery of the comparative example 2 containing no additive can not normally discharge during the first discharging cycle, indicating that the materials used in the battery collapsed during the first cycle charging-discharging test. FIG. 1C showed that the battery of the comparative example 3 containing PS of 1 wt % can normally discharge; however, the charging and discharging capacity decayed quickly after the second cycle charging-discharging test. The result demonstrated that the carbonaceous material exfoliated after the second cycle charging-discharging test. Besides, FIG. 1C also showed that the fifth reversible discharging capacity was only 21 mAh/g, lower than 7% of the first discharging capacity. According to FIG. 1D, it showed that the battery of the comparative example 4 containing VC of 1 wt % collapsed during the first cycle charging-discharging test and the first reversible discharging capacity was lower than 20 mAh/g. FIG. 1E showed that the battery of the comparative example 5 containing compound 8 of 1 wt % can normally charge or discharge during the first cycle charging-discharging test. However, the charging capacity and discharging capacity decayed quickly after the second cycle charging-discharging test, suggesting that the carbonaceous material exfoliated after the second cycle charging-discharging test. Furthermore, as shown in FIG. 1E, the fifth reversible discharging capacity was lower than 10 mAh/g (i.e. lower than 3% of the first discharging capacity), suggesting that compound 8 did not have an ability to protect carbonaceous materials in the electrolyte containing a high level of PC. From the above results, the electrolyte of the present invention was useful for suppressing the exfoliation of materials used in the batteries, and therefore enhanced the lifetime of batteries.

Example 2

Charging-discharging Test of the Lithium Ion Secondary Battery with the Additive of the Present Invention The test according to the example 2 of the present invention was conducted in the lithium ion secondary battery. Table 3 listed the materials and components used in the lithium ion secondary batteries of the example 2 and comparative example 6, wherein the comparative example 6 used the same materials as the example 1 except use of 1.5 wt % VC as an additive.

TABLE 3 the materials and components used in the lithium ion secondary batteries of the example 2 and comparative example 6

| | Anode sheet | NG/conductive carbon black/PVdF = 90/3/7 (wt %) |
|---|---|---|
| Electrolyte | Organic solvent | PC:DEC = 1:2 (by weight) |
| | Salt | LiPF$_6$ at a concentration of 11.8 wt % |
| Additive | Example 2-1 | Compound 2 in the amount of 1.5 wt % |
| | Example 2-2 | Compound 3 in the amount of 1.5 wt % |
| | Example 2-3 | Compound 4 in the amount of 1.5 wt % |
| | Example 2-4 | Compound 5 in the amount of 1.5 wt % |
| | Example 2-5 | Compound 6 in the amount of 1.5 wt % |
| | Example 2-6 | Compound 7 in the amount of 1.5 wt % |
| | Comparative example 6 | VC in the amount of 1.5 wt % |

Figure 2A:
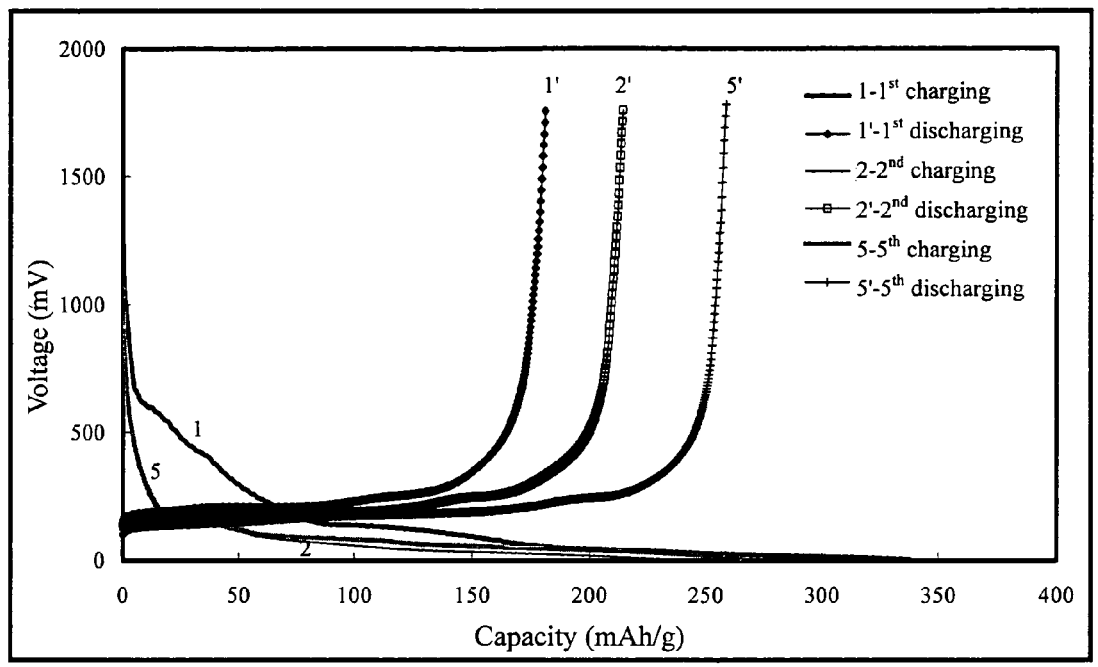
FIG. 2A shows the result of charging-discharging test according to the battery of example 2-1 of the present invention.
Figure 2B:
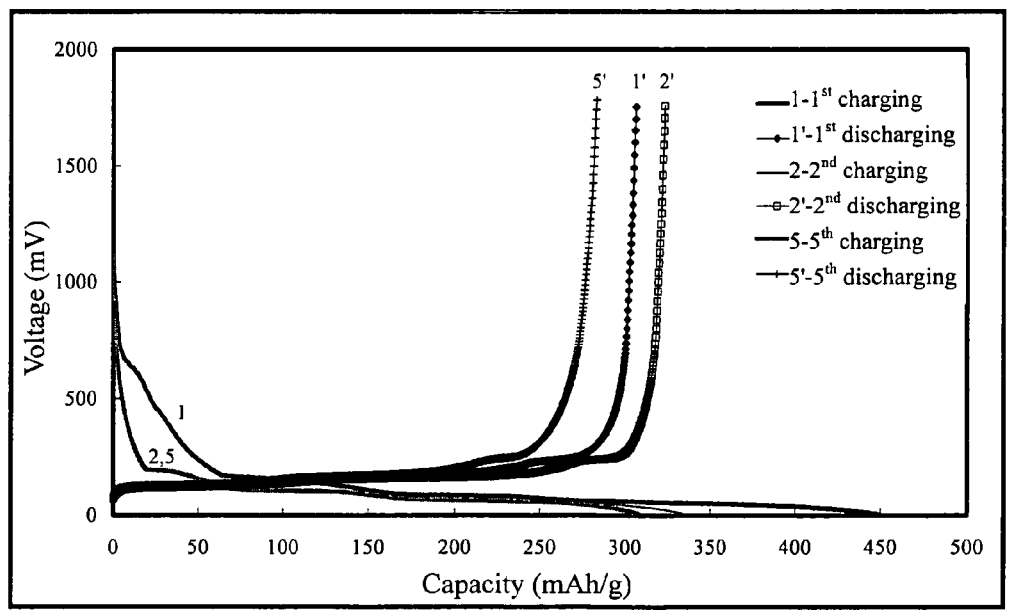
FIG. 2B shows the result of charging-discharging test according to the battery of example 2-2 of the present invention.
Figure 2C:
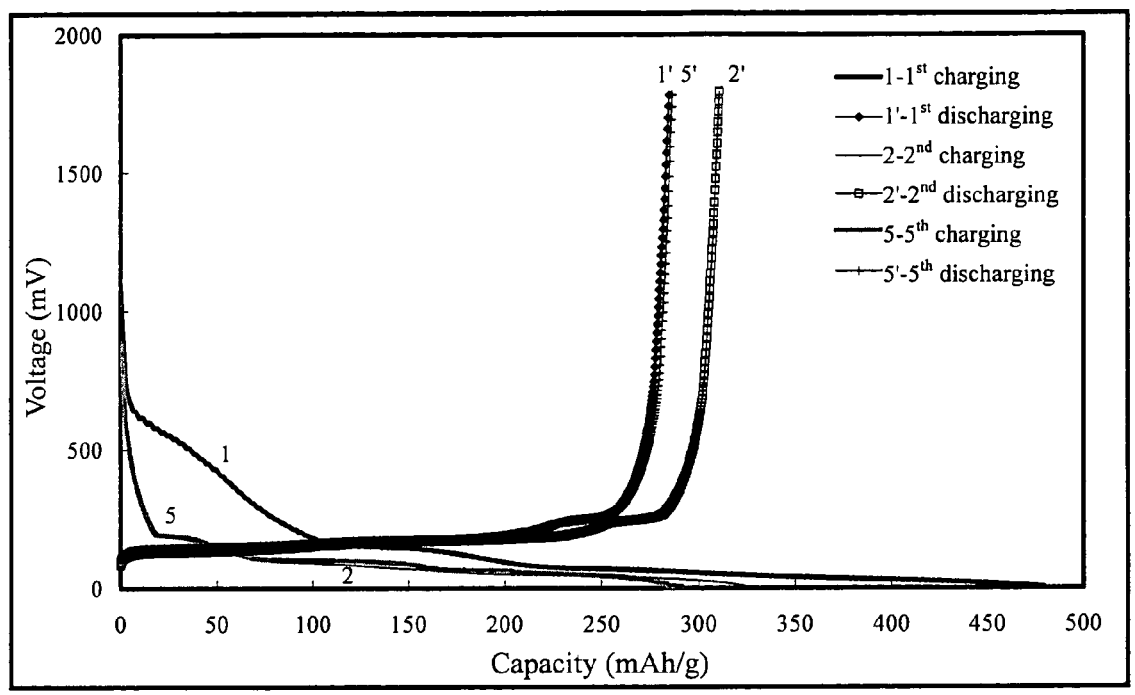
FIG. 2C shows the result of charging-discharging test according to the battery of example 2-3 of the present invention.
Figure 2D:
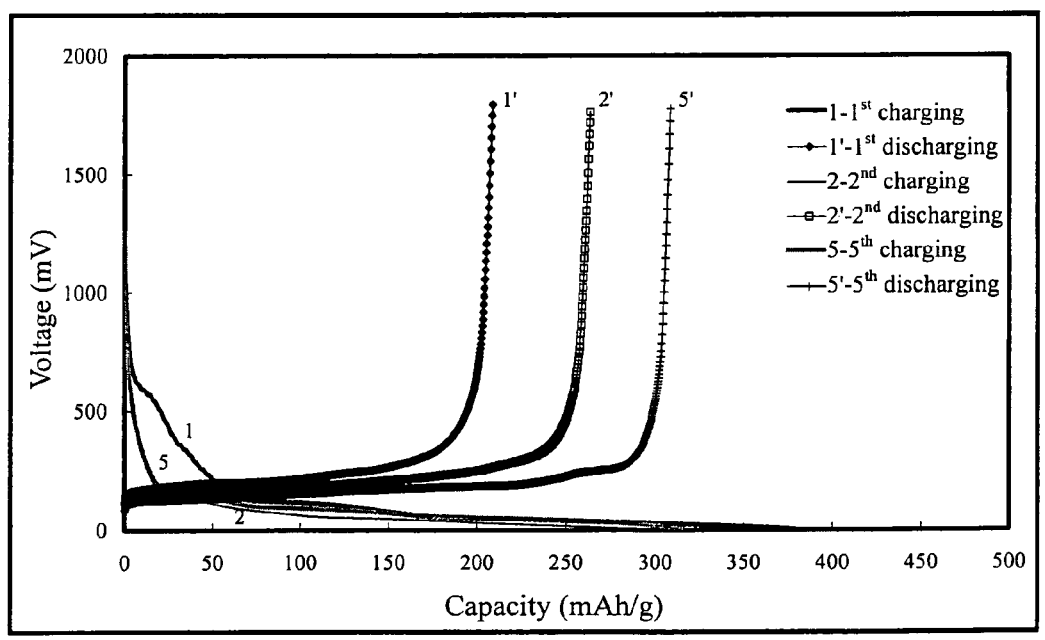
FIG. 2D shows the result of charging-discharging test according to the battery of example 2-4 of the present invention.
Figure 2E:
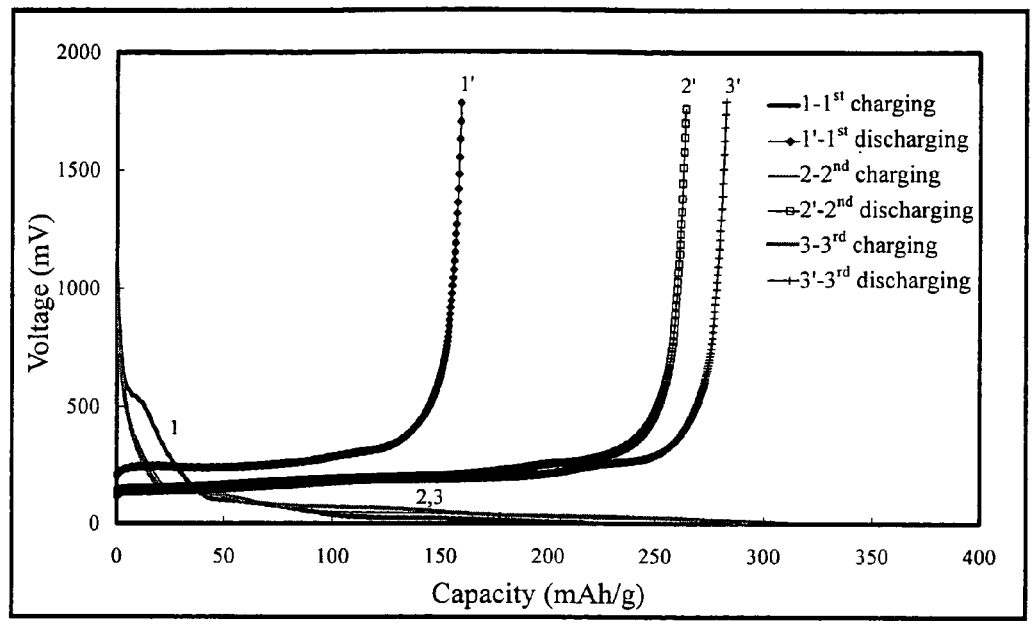
FIG. 2E shows the result of charging-discharging test according to the battery of example 2-5 of the present invention.
Figure 2F:
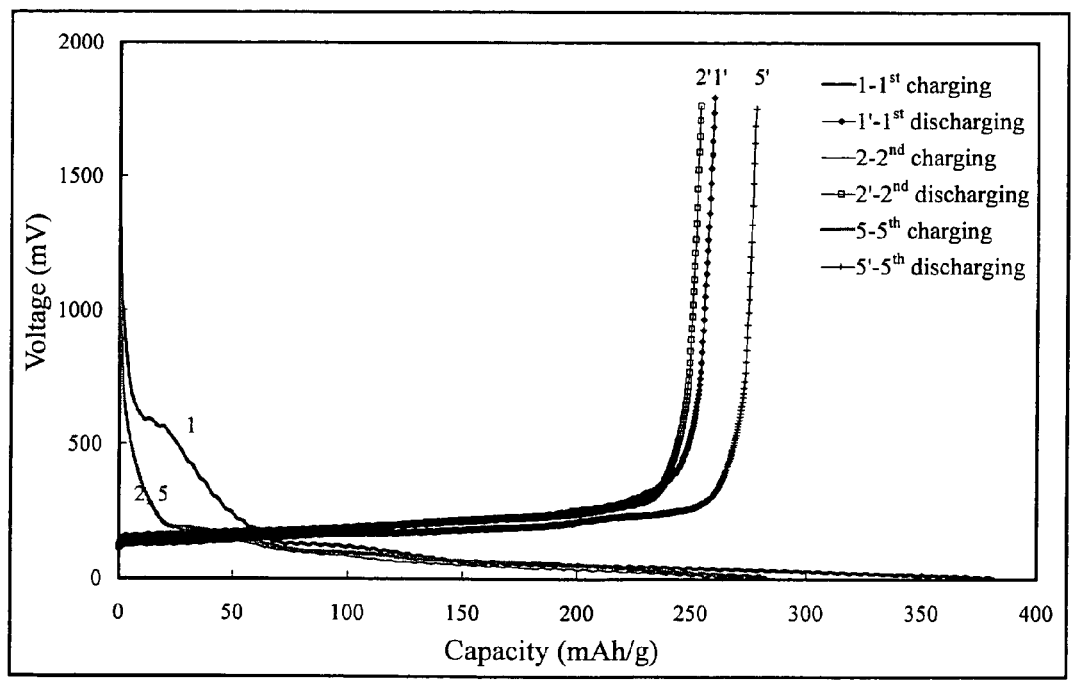
FIG. 2F shows the result of charging-discharging test according to the battery of example 2-6 of the present invention.
Figure 2G:
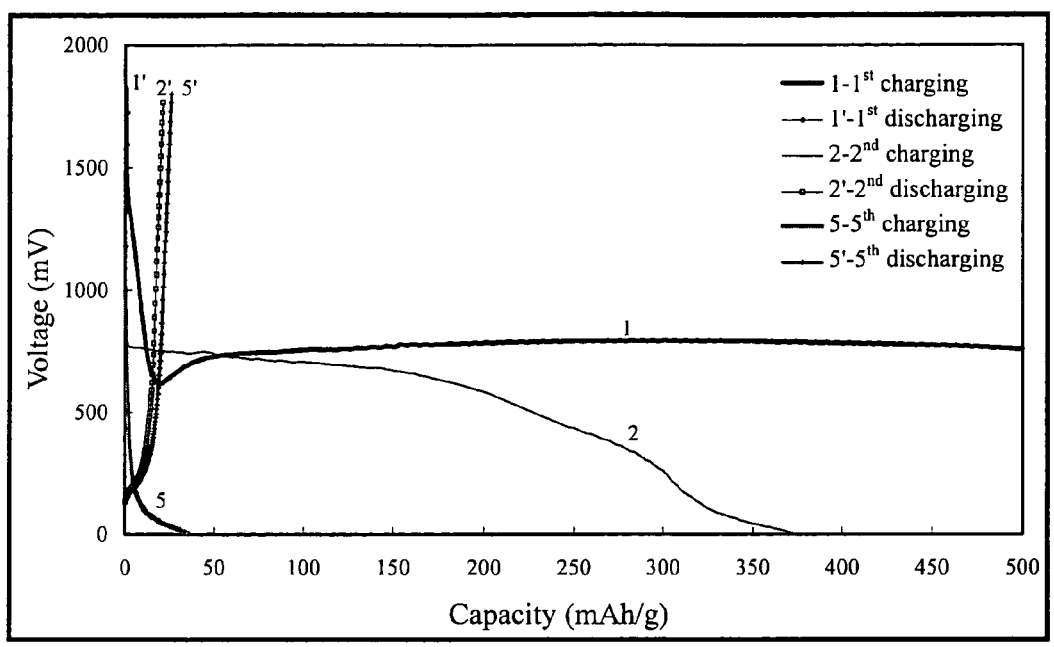
FIG. 2G shows the result of charging-discharging test according to the battery of comparative example 6 of the present invention.

FIG. 2A to FIG. 2G showed the results of charging-discharging test according to the batteries of the examples 2-1, 2-2, 2-3, 2-4, 2-5, and 2-6, and the comparative example 6, respectively. In these figures, FIG. 2A showed the battery of the example 2-1 containing the compound 2 in the amount of 1.5 wt % had a discharging capacity of more than 250 mAh/g, indicating that the battery still maintained an excellent reversible charging-discharging property after continuous five charging-discharging tests. FIG. 2G showed that the materials used in the battery of the comparative example 6 containing VC of 1.5 wt % exfoliated during the first cycle charging-discharging test. As shown in FIG. 2G, the reversible discharging capacity was lower than 2 mAh/g during the first discharging cycle and it was still lower than 30 mAh/g during the second and fifth charging-discharging, which was far less than an actual capacity of natural crystalline flake graphite. It proved that VC of 1.5 wt % still can not effectively suppress the exfoliation of natural crystalline flake graphite in the electrolyte containing a high level of PC. From above results, the compound 2 as an additive of electrolyte of the present invention was benefic to suppress the exfoliation of materials used in the batteries, thereby enhancing the lifetime of batteries.

As shown in FIG. 2B, the battery in accordance with the example 2-2 of the present invention containing the compound 3 of 1.5 wt % had a capacity of 306 mAh/g during the first discharging and still maintained an excellent property of reversible charging-discharging (a capacity of 283 mAh/g) after continuous five charging-discharging tests. The result demonstrated that the compound 3 as an additive of electrolyte of the present invention was benefic to suppress the exfoliation of materials used in the batteries, resulting in enhancement of the lifetime of batteries.

As shown in FIG. 2C, the battery in accordance with the example 2-3 of the present invention containing the compound 4 of 1.5 wt % had a discharging capacity of 286 mAh/g after continuous five charging-discharging tests, indicating that the battery still maintained an excellent property of reversible charging-discharging. From the above results, the compound 4 as an additive of electrolyte of the present invention was benefic to suppress the exfoliation of materials used in the batteries, resulting in enhancement of the lifetime of batteries.

As shown in FIG. 2D, the battery in accordance with the example 2-4 of the present invention containing the compound 5 of 1.5 wt % had a discharging capacity of more than 300 mAh/g after continuous five charging-discharging tests, indicating that the battery still maintained an excellent property of reversible charging-discharging. That proved that the compound 5 as an additive of electrolyte of the present invention was benefic to suppress the exfoliation of materials used in the batteries, thereby enhancing the lifetime of batteries.

As shown in FIG. 2E, the battery in accordance with the example 2-5 of the present invention containing the compound 6 of 1.5 wt % had a capacity of 160 mAh/g during the first discharging, and a capacity of 283 mAh/g during the third discharging. From the above result, the compound 6 as an additive of electrolyte of the present invention was benefic to suppress the exfoliation of materials used in the batteries, resulting in enhancement of the lifetime of batteries.

As shown in FIG. 2F, the battery in accordance with the example 2-6 of the present invention containing the compound 7 of 1.5 wt % had a capacity of 260 mAh/g during the first discharging, and had a capacity of 278 mAh/g during the fifth discharging. The result demonstrated that the compound 7 as an additive of electrolyte of the present invention was benefic to suppress the exfoliation of materials used in the batteries, resulting in enhancement of the lifetime of batteries.

Example 3

Charging-discharging Test Using the Lithium Ion Secondary Battery Having the Additive of the Present Invention The test according to the example 3 of the present invention was conducted in the lithium ion secondary battery. Table 4 listed the materials and components used in the lithium ion secondary batteries of the example 3 and comparative example 7, wherein the comparative example 7 used the same materials as the example 3 except for no additive.

TABLE 4 the materials and components used in the batteries of the example 3 and comparative example 7

| | | |
|---|---|---|
| | Anode sheet | NG-Sn/conductive carbon black/PVdF = 90/3/7 (wt %) |
| Electrolyte | Organic solvent | PC:EC:DEC = 8:22:70 (by weight) |
| | Salt | LiPF$_6$ at a concentration of 11.8 wt % |
| Additive | Example 3 | Compound 1 in the amount of 1 wt % |
| | Comparative example 7 | None |

*NG-Sn referred to natural crystalline flake graphite modified by tin without electroplating

Cycle Life Test

In order to test batteries in cycle life, the batteries of the example 3 and the comparative examples 7 were fabricated into coin half-cells, and then connected with a charging-discharging tester (8 channels). During the charging-discharging test, the batteries were charged at 0.1 C to a cut-off voltage of 3 mV, and then discharged at 0.5 C to a cut-off voltage of 1800 mV. In this test, there was totally thirty charging-discharging cycles. Besides, changes of voltage were recorded by a computer during the test and the resulting data were calculated to obtain the values of capacity.

Figure 3:
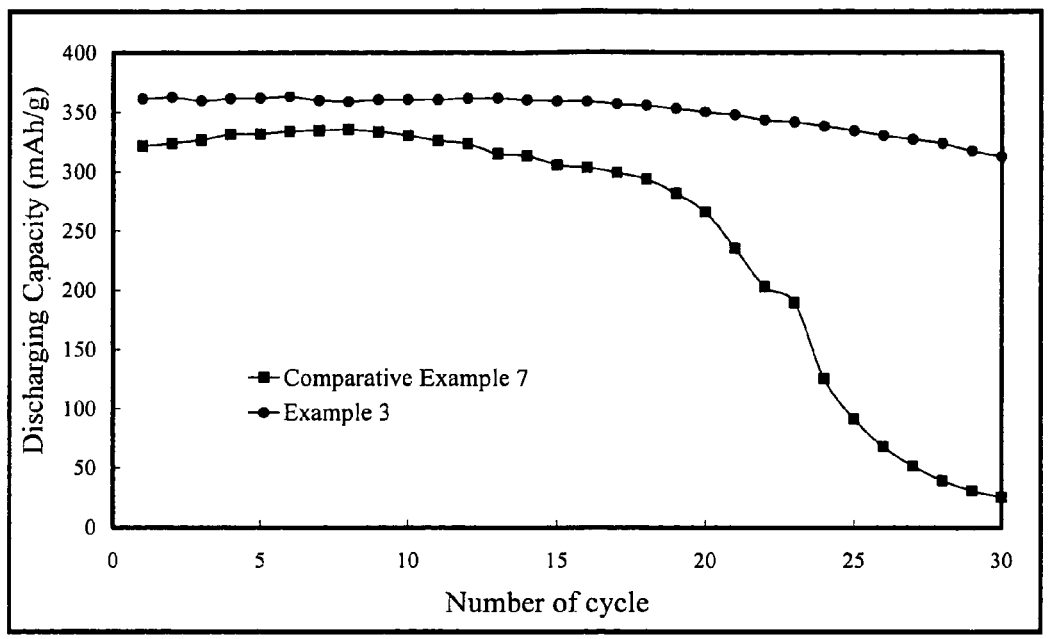
FIG. 3 shows the results of cycle lifetime test according to the batteries of example 3 and comparative example 7 of the present invention.

FIG. 3 showed the results of cycle lifetime test according to the batteries of example 3 and comparative example 7 of the present invention. According to the result of cycle life test, the capacity of the battery of the example 3 was higher than that of the comparative example 7 containing no additive. Moreover, the battery of the example 3 had still a capacity more than 300 mAh/g after the cycle life test of thirty times, while the battery of the comparative example 7 had a decayed capacity less than 50 mAh/g. This result showed that the additive of the present invention can enhance the capacity of the battery and effectively enhance the cycle life of battery.

Example 4

Charging-discharging Test Using the Lithium Ion Secondary Battery Having the Additive of the Present Invention The test according to the example 4 of the present invention was conducted in the lithium ion secondary battery. Table 5 listed the materials and components used in the lithium ion secondary batteries of the example 4 and comparative example 8, wherein the comparative example 8 used the same materials as the example 4 except for no additive.

TABLE 5 the materials and components used in the batteries of the example 4 and comparative example 8

| | | |
|---|---|---|
| | Anode sheet | MCMB25-28/conductive carbon black/PVdF = 90/3/7 (wt %) |
| Electrolyte | Organic solvent | PC:EC = 1:2 (by weight) |
| | Salt | LiPF$_6$ at a concentration of 11.8 wt % |
| Additive | Example 4-1 | Compound 3 in the amount of 1.5 wt % |
| | Example 4-2 | Compound 5 in the amount of 1.5 wt % |
| | Example 4-3 | Compound 1 in the amount of 1.0 wt % |
| | Comparative example 8 | None |

*MCMB25-28 represented the product of Osaka Gas Chemicals (OGC).

Figure 4:
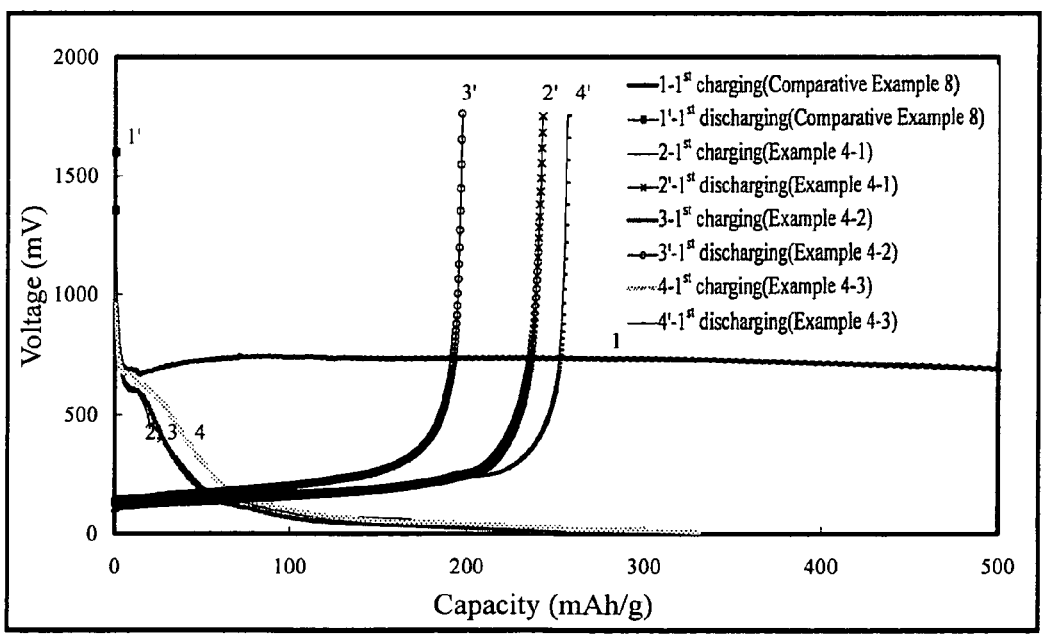
FIG. 4 is charging-discharging curves of the first cycle according to the batteries of the comparative example 8, examples 4-1, 4-2, and 4-3.

FIG. 4 displayed charging-discharging curves of the first cycle according to the batteries of the comparative example 8, examples 4-1, 4-2, and 4-3. In this figure, the curves 1 and 1' indicated that the materials used in the comparative example 8 containing no additive exfoliated during the first cycle charging-discharging. During the first charging-discharging cycle, the battery of the comparative example 8 only had a reversible discharging capacity of 0.5 mAh/g, suggesting that it can not normally charging and discharging. In FIG. 4, the curves 2 and 2', 3 and 3', and 4 and 4' displayed charging-discharging curves of the first cycle of the example 4-1 containing compound 3 of 1.5 wt %, the example 4-2 containing compound 5 of 1.5 wt %, and the example 4-3 containing compound 1 of 1.0 wt %, respectively. As shown in this figure, these curves (2 and 2', 3 and 3', and 4 and 4') all showed that the batteries had an excellent charging-discharging efficiency. From the above results, the compounds 3, 5, and 1 as additives of electrolyte of the present invention are all useful for suppressing the exfoliation of the MCMB25-28 in the electrolyte containing a high level of PC to improve the charging-discharging performance of anodic material.

Example 5

Charging-discharging Test Using the Lithium Ion Secondary Battery Having the Additive of the Present Invention The test according to the example 5 of the present invention was conducted in the lithium ion secondary battery. Table 6 listed the materials and components used in the lithium ion secondary batteries of the example 5 and comparative example 9, wherein the comparative example 9 used the same materials as the example 5 except for no additive.

TABLE 6 the materials and components used in the batteries of the example 5 and comparative example 9

| | | |
|---|---|---|
| | Anode sheet | MGP/conductive carbon black/PVdF = 90/3/7 (wt %) |
| Electrolyte | Organic solvent | PC:EC = 1:2 (by weight) |
| | Salt | LiPF$_6$ at a concentration of 11.8 wt % |
| Additive | Example 5-1 | Compound 3 in the amount of 1.5 wt % |
| | Example 5-2 | Compound 5 in the amount of 1.5 wt % |
| | Example 5-3 | Compound 1 in the amount of 1.0 wt % |
| | Comparative example 9 | None |

*MGP was an anode material purchased from China Steel Chemical Corporation.

Figure 5:
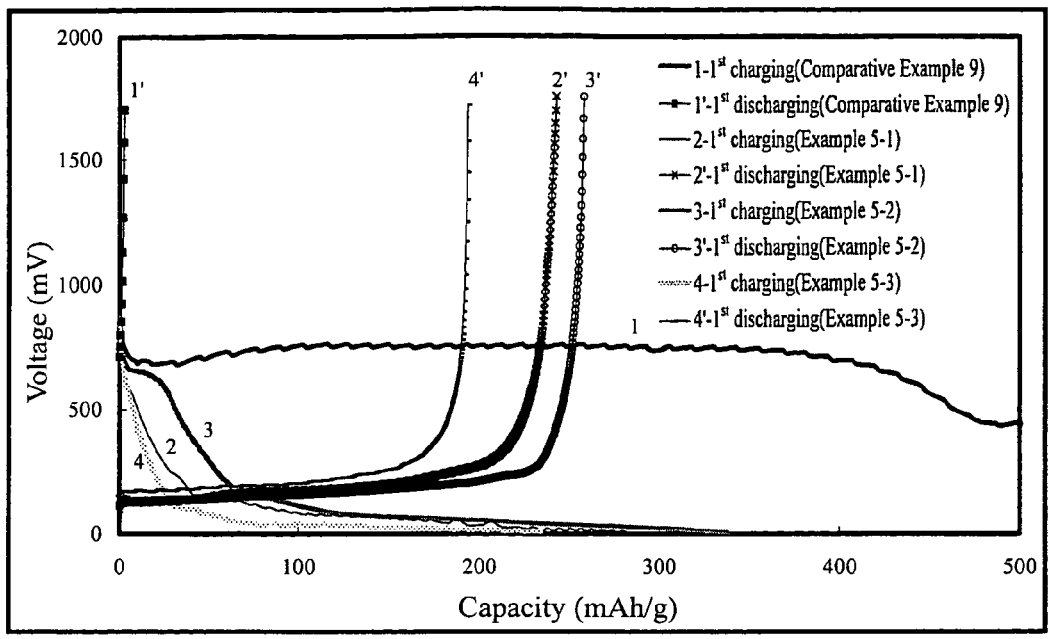
FIG. 5 is charging-discharging curves of the first cycle according to the batteries of the comparative example 9, examples 5-1, 5-2, and 5-3.

FIG. 5 showed charging-discharging curves of the first cycle according to the batteries of the comparative example 9, examples 5-1, 5-2, and 5-3. In these charging-discharging curves, the curves 1 and 1' indicated that the materials used in the comparative example 9 containing no additive exfoliated during the first cycle charging-discharging. During the first charging-discharging cycle, the battery of the comparative example 9 only had a reversible discharging capacity of less than 3 mAh/g, demonstrating that it can not normally charging and discharging. In FIG. 5, the curves 2 and 2', 3 and 3', and 4 and 4' charging-discharging curves of the first cycle of the example 5-1 containing compound 3 of 1.5 wt %, the example 5-2 containing compound 5 of 1.5 wt %, and the example 5-3 containing compound 1 of 1.0 wt %. As shown in FIG. 5, these curves (2 and 2', 3 and 3', and 4 and 4') all showed that the batteries had an excellent charging-discharging efficiency. From the above results, the compounds 3, 5, and 1 as additives of electrolyte of the present invention are all useful for suppressing the exfoliation of the MGP in the electrolyte having a high level of PC to improve the charging-discharging performance of anodic material.

Example 6

Effect of the Electrolytes of the Present Invention on Cathode Sheet

The examples 1-5 as above-mentioned were all test results showing effect of the electrolytes of the present invention on anode sheet. In order to test effect of the electrolytes of the present invention on cathode sheet, LiFePO$_4$/conductive carbon black/PVdF and lithium metal were used as a cathode and an anode, respectively. In the table 7, it listed the materials and components used in the lithium ion secondary batteries of the example 6 and comparative example 10 in detail. Equally, the materials of the cathode sheet used in the present invention and the methods for producing the same were known in the art, so they were not mentioned herein.

TABLE 7 the materials and components used in the batteries of the example 6 and comparative example 10

| | Cathode sheet | LiFePO$_4$/conductive carbon black/PVdF = 91/3/6 (wt %) |
|---|---|---|
| | Anode sheet | Lithium metal |
| Electrolyte | Organic solvent | EC:DEC = 1:1 (by weight) |
| | Salt | LiPF$_6$ at a concentration of 11.8 wt % |
| Additive | Example 6 | Compound 1 in the amount of 1 wt % |
| | Comparative example 10 | None |

Figure 6:
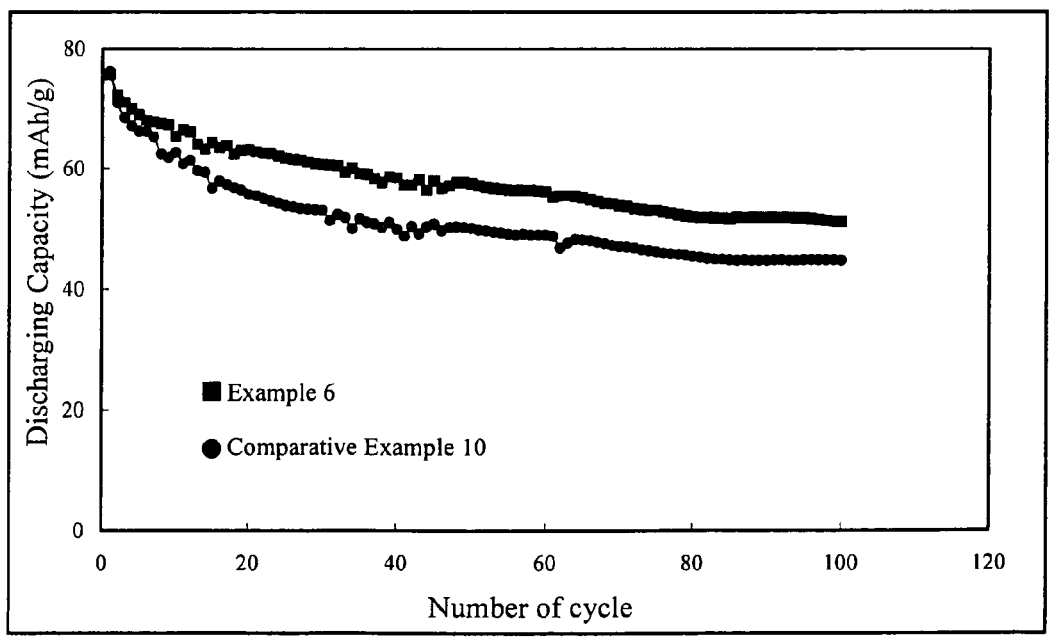
FIG. 6 shows the results of cyclic lifetime test according to the batteries of the comparative example 10 and the example 6.

The capacity of the battery of the example 6 was measured by charging-discharging cycle test under room temperature. In said test, the charging condition was constant-current charge of 1 C and cut-off charge of 4000 mV, and the discharging condition was constant-current discharge of 1 C and cut-off discharge of 2500 mV. FIG. 6 showed that the changes of capacity depended on the numbers of charging-discharging cycle, wherein the comparative example 10 used the same materials as the example 1 except for no additive. From the results shown in FIG. 6, the electrochemical device using the electrolyte of the present invention can maintain a higher capacity.

To sum up above, the electrolyte of the present invention can form a steady SEI layer on the carbonaceous material of anode by using new additives to protect the surface of carbonaceous material and suppress the occurrence of exfoliation, thereby enhancing the lifetime of the battery. Furthermore, the additive of the present invention was useful for slowing down the decay of capacity on the cathode and hence maintained a better performance.

Other Embodiments

All characteristics disclosed herein can be combined in any combination. And the characteristics disclosed herein can be replaced by any characteristics to be used for the same, equal, or similar purpose. Thus, unless otherwise specified, the characteristics disclosed herein are examples of a series of equal or similar characteristics.

In addition, based on the disclosure herein, appropriate changes and modifications may be made by those skilled in the art according to different uses and situations without departing from the spirit and scope of the invention. Therefore, other embodiments are included in the claims of the present invention.

What is claimed is:

1. An electrolyte for an electrochemical device, comprising:

1.18-35.4 wt % of a salt, 0.1-9 wt % of a compound represented by below formula (I):

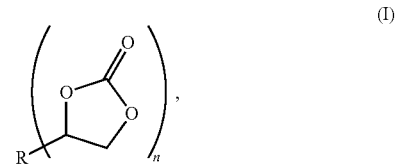

and an organic solvent as a complement to 100 wt %, wherein R is an aliphatic or aromatic residue unsubstituted or substituted with one or more substituents, and said substituents are selected from the group consisting of one or more halogen, $C_1$-$C_8$ alkyl, $C_1$-$C_8$ alkoxy, $C_6$-$C_{10}$ aryl, $C_6$-$C_{10}$ aryloxy, $C_3$-$C_6$ cycloalkyl, $C_3$-$C_6$ cycloalkoxy, $C_1$-$C_3$ carboxy, and sulfur; n is 2, 3, or 4, in which one or more methylene groups (—CH$_2$—) in the aliphatic or aromatic residue can be independently replaced by oxygen (—O—), $C_6$-$C_{10}$ arylene, $C_6$-$C_{10}$ cycloalkylene,

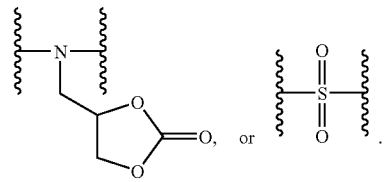

2. The electrolyte according to claim 1, wherein the compound represented by formula (I) is

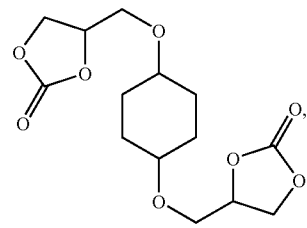

-continued
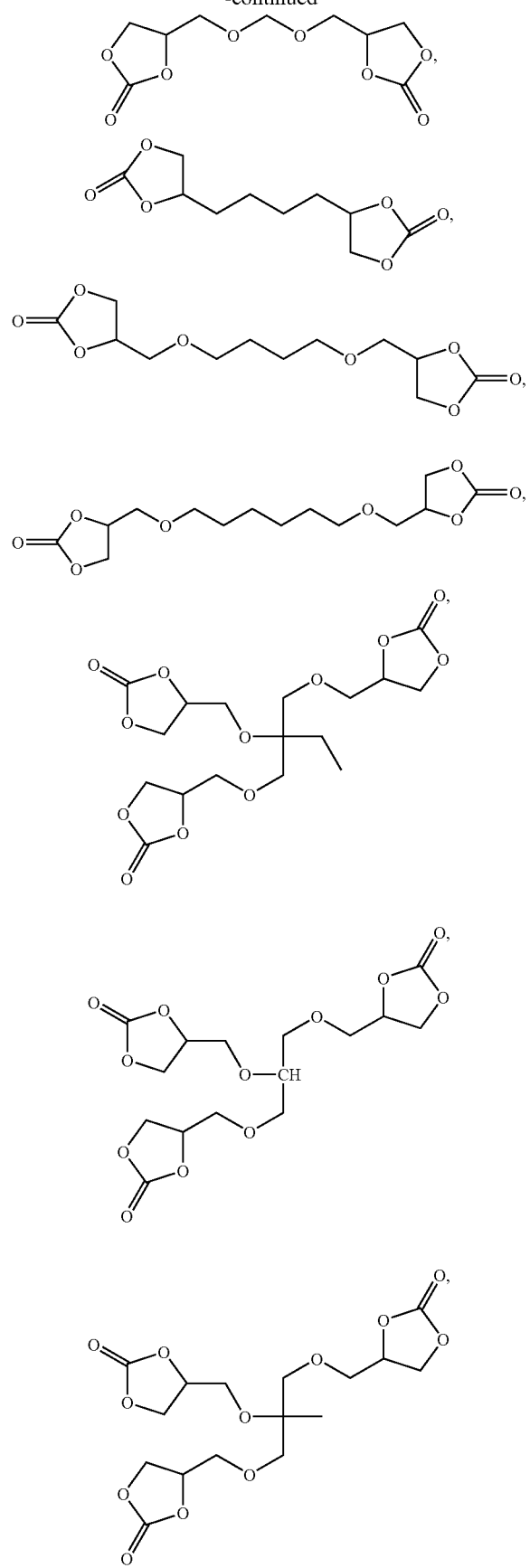
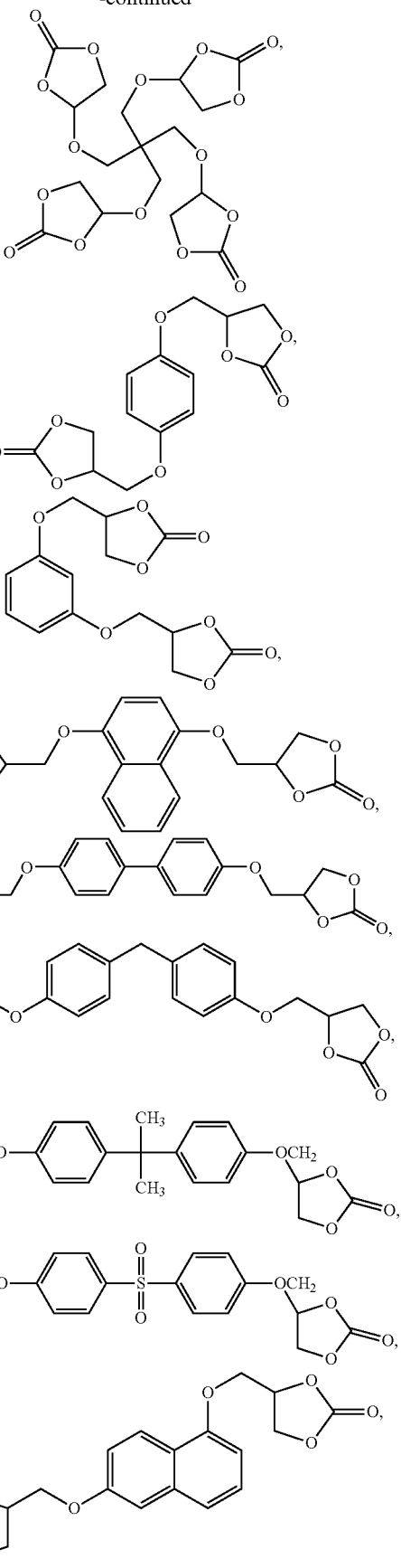

-continued

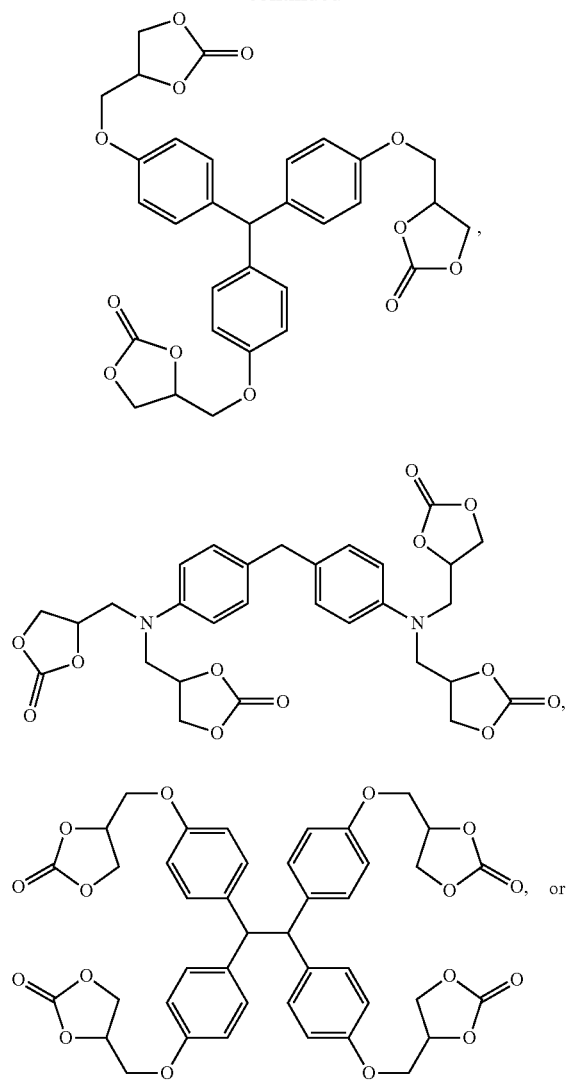

3. The electrolyte according to claim 1, wherein the amount of the compound represented by formula (I) is 0.5-5 wt %.

4. The electrolyte according to claim 1, wherein the amount of the salt is 5.9-23.6 wt %.

5. The electrolyte according to claim 1, wherein said organic solvent is selected from the group consisting of cyclic carbonates, linear carbonates, lactones, ethers, esters, acetonitriles, lactams, ketones, and halogen derivatives thereof.

6. The electrolyte according to claim 5, wherein said organic solvent is a mixture of the cyclic carbonates and the linear carbonates.

7. The electrolyte according to claim 1, wherein a cation of said salt is selected from the group consisting of $Li^+$, $Na^+$, and $K^+$.

8. The electrolyte according to claim 7, wherein an anion of said salt is selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2$ and $C(CF_2SO_2)_3^-$.

9. An electrochemical device, comprising an anode, a cathode, and the electrolyte according to claim 1.

10. The electrochemical device according to claim 9, which is a lithium ion secondary battery.

* * * * *